United States Patent
Chatani et al.

(10) Patent No.: US 9,936,355 B2
(45) Date of Patent: Apr. 3, 2018

(54) INFORMATION PROCESSING APPARATUS, INFORMATION PROCESSING METHOD, AND COMPUTER PROGRAM

(71) Applicant: SONY CORPORATION, Tokyo (JP)

(72) Inventors: Masayuki Chatani, Tokyo (JP); Akihiro Ihori, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/514,590

(22) PCT Filed: Sep. 9, 2015

(86) PCT No.: PCT/JP2015/075629
§ 371 (c)(1),
(2) Date: Mar. 27, 2017

(87) PCT Pub. No.: WO2016/067765
PCT Pub. Date: May 6, 2016

(65) Prior Publication Data
US 2017/0238144 A1   Aug. 17, 2017

(30) Foreign Application Priority Data

Oct. 27, 2014 (JP) .................................. 2014-218111

(51) Int. Cl.
| | |
|---|---|
| *H04W 4/02* | (2018.01) |
| *H04L 29/08* | (2006.01) |
| *H04L 12/24* | (2006.01) |
| *G10L 15/22* | (2006.01) |
| *G06K 9/00* | (2006.01) |

(52) U.S. Cl.
CPC ........ *H04W 4/028* (2013.01); *G06K 9/00335* (2013.01); *G10L 15/22* (2013.01); *H04L 41/0816* (2013.01); *H04L 67/12* (2013.01); *H04L 67/24* (2013.01); *H04L 67/306* (2013.01)

(58) Field of Classification Search
CPC ........ H04W 4/028; H04W 4/008; G06F 15/16
See application file for complete search history.

(56) References Cited

U.S. PATENT DOCUMENTS

| | | | |
|---|---|---|---|
| 2006/0156209 A1 | 7/2006 | Matsuura et al. | |
| 2012/0140042 A1* | 6/2012 | Albertson | ........ G08B 13/19613 |
| | | | 348/46 |

FOREIGN PATENT DOCUMENTS

| | | | | |
|---|---|---|---|---|
| JP | 2003-158664 A | | 5/2003 | |
| JP | 2006-172440 | * | 6/2006 | ............. G06F 15/00 |
| JP | 2006-172440 A | | 6/2006 | |
| JP | 2010-205111 | * | 9/2010 | ............. G06F 15/00 |

(Continued)

OTHER PUBLICATIONS

International Search Report dated Dec. 15, 2015, in PCT/JP2015/075629, filed Sep. 9, 2015.

Primary Examiner — Myron K Wyche
(74) Attorney, Agent, or Firm — Oblon, McClelland, Maier & Neustadt, L.L.P.

(57) ABSTRACT

An information processing apparatus including a control unit configured to perform control to detect leaving of a user from the information processing apparatus and transmit at least part of context information exchanged with the user until then to another apparatus. The information processing apparatus can improve user-friendliness by detecting behavior of a user and linking data with each other in advance between equipment to be operated by the user.

19 Claims, 8 Drawing Sheets

(56) References Cited

FOREIGN PATENT DOCUMENTS

| | | |
|---|---|---|
| JP | 2010-205111 A | 9/2010 |
| JP | 2013-516912 A | 5/2013 |
| WO | 2004/077291 A1 | 9/2004 |

\* cited by examiner

INFORMATION PROCESSING APPARATUS, INFORMATION PROCESSING METHOD, AND COMPUTER PROGRAM

TECHNICAL FIELD

The present disclosure relates to an information processing apparatus, an information processing method, and a computer program.

BACKGROUND ART

In accordance with development of information processing technology and communication technology, types as well as the number of equipment which can be connected to the Internet have rapidly increased. There is growing attention on a concept called Internet of things (IoT) which realizes more dynamic and autonomous exchange of information by connecting a number of such equipment. Patent Literature 1 proposes a technology which provides assistance over a plurality of networks which use different radio access technologies.

CITATION LIST

Patent Literature

Patent Literature 1: JP 2013-516912T

DISCLOSURE OF INVENTION

Technical Problem

A user ordinarily has a plurality of equipment which is connected to the Internet, and, in a case where, in a state where the user performs operation on one equipment, the user moves to another location and tries to perform operation on another equipment, if operation performed until then can be continued, user-friendliness would dramatically improve.

Therefore, the present disclosure proposes new and improved information processing apparatus, information processing method and computer program which can dramatically improve user-friendliness by detecting behavior of the user and linking data with each other in advance between equipment to be operated by the user.

Solution to Problem

According to the present disclosure, there is provided an information processing apparatus including a control unit configured to perform control to detect leaving of a user from the information processing apparatus and transmit at least part of context information exchanged with the user until then to another apparatus.

In addition, according to the present disclosure, there is provided an information processing apparatus including a control unit configured to perform control to detect approaching of a user to the information processing apparatus and receive at least part of context information exchanged with the user until then from another apparatus.

In addition, according to the present disclosure, there is provided an information processing method including performing control to detect leaving of a user from an information processing apparatus and transmit at least part of context information exchanged with the user until then to another apparatus.

In addition, according to the present disclosure, there is provided a computer program causing a computer to execute performing control to detect leaving of a user from an information processing apparatus and transmit at least part of context information exchanged with the user until then to another apparatus.

In addition, according to the present disclosure, there is provided an information processing method including performing control to detect approaching of a user to an information processing apparatus and receive at least part of context information exchanged with the user until then from another apparatus.

In addition, according to the present disclosure, there is provided a computer program causing a computer to execute performing control to detect approaching of a user to an information processing apparatus and receive at least part of context information exchanged with the user until then from another apparatus.

Advantageous Effects of Invention

As described above, according to the present disclosure, it is possible to provide new and improved information processing apparatus, information processing method and computer program which can dramatically improve user-friendliness by detecting behavior of the user and linking data with each other in advance between equipment to be operated by the user.

Note that the effects described above are not necessarily limitative. With or in the place of the above effects, there may be achieved any one of the effects described in this specification or other effects that may be grasped from this specification.

MODE FOR CARRYING OUT THE INVENTION

Figure 1:
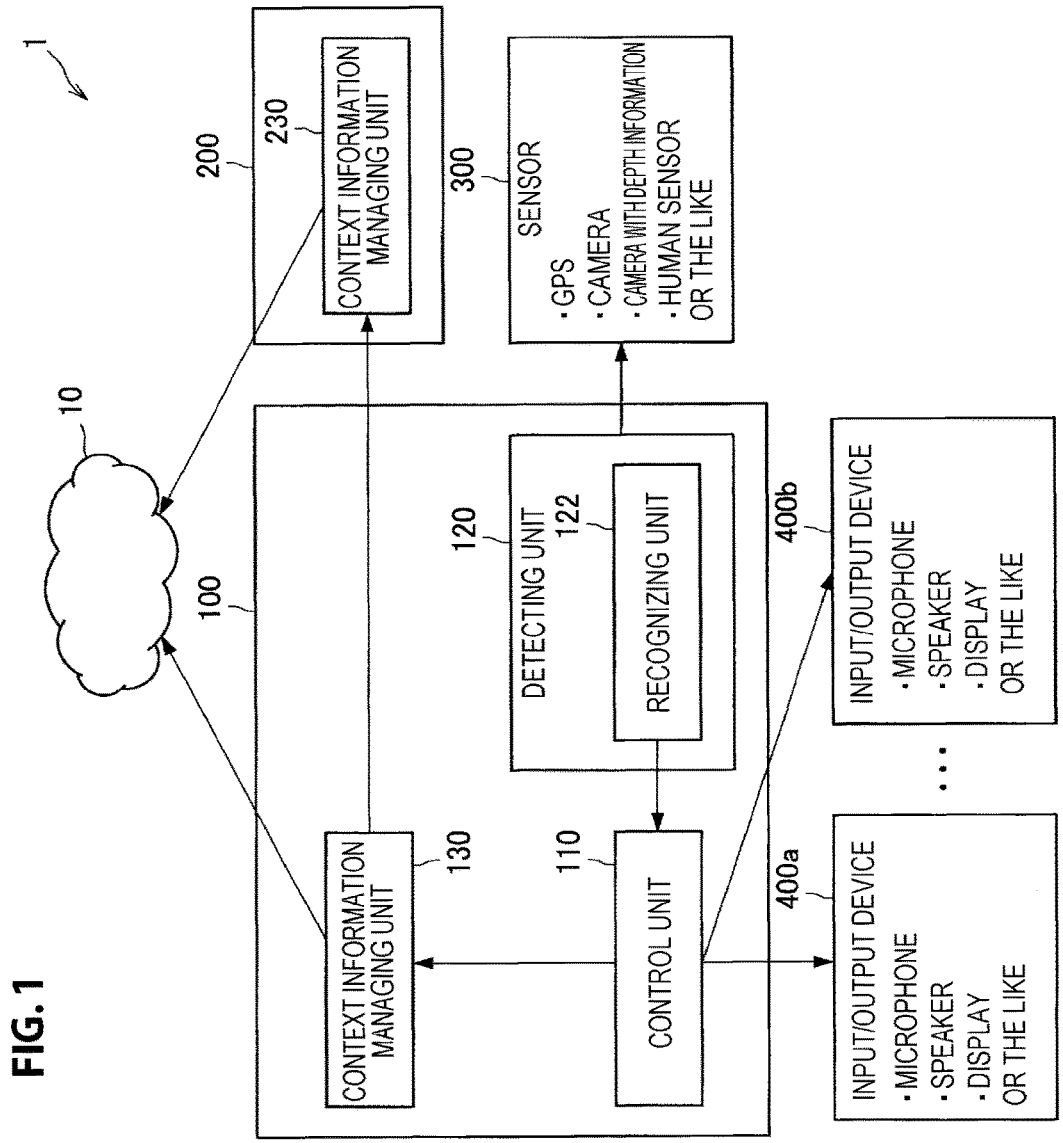
FIG. 1 is an explanatory diagram illustrating an overall configuration example of an information processing system 1 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Embodiment of present disclosure
1.1. Background
1.2. Configuration example
1.3. Operation example 2. Hardware configuration example
3. Conclusion

1. Embodiment of Present Disclosure

1.1. Background

Before an embodiment of the present disclosure is described in detail, first, background of the embodiment of the present disclosure will be described. After the background is described, the embodiment of the present disclosure will be described in detail.

As described above, in accordance with development of information processing technology and communication technology, the number and types of equipment which can be connected to the Internet have significantly increased. A user can acquire information or give an instruction from one equipment to another equipment by connecting to the Internet using various kinds of such equipment which can be connected to the Internet. As described above, there is a growing attention on the concept called Internet of things (IoT) which realizes more dynamic and autonomous exchange of information by connecting a number of equipment.

Note that, in the following description, equipment which can be connected to the Internet and which can give and accept information will be collectively referred to as an "IoT device".

The user has a plurality of IoT devices and can give an instruction to the IoT device or watch or listen to content acquired by the IoT device while switching an IoT device to be operated. Information concerning input and output between the user and the IoT device will be hereinafter referred to as "context information".

However, in a case where the user gives an instruction to the IoT device while switching the IoT device to be operated, if the IoT devices do not coordinate with each other and respectively independently operate, that is, if context information is not linked with each other, the user has to perform processing which has been performed on the IoT device operated until then from the beginning again when switching the IoT device.

This will be described using an example. It is assumed that one IoT device has a speech recognition function, the user can input a command to the IoT device by speaking to the IoT device, and the IoT device can execute predetermined processing and perform output on the basis of the input command. If the IoT device is identical, in a case where the user utters a reference term such as "it" and "a little while ago", the IoT device can execute appropriate processing by analyzing content uttered by the user and judging what is specifically referred to by these reference terms on the basis of context information with the user until then.

However, in a case where the user switches a device with which the user interacts to another IoT device, if the IoT devices before and after switching do not coordinate with each other, because context to the IoT device before switching is not taken over to the IoT device after switching, the user cannot utilize the context information until then in interaction with the IoT device after switching, so that the user needs to start new interaction from zero. That is, if the context information is not taken over between the IoT devices, even if the user utters reference terms such as "it" and "a little while ago" to the IoT device after switching, while the IoT device can convert content uttered by the user into text using the speech recognition function and can recognize that the user says "it" and "a little while ago", because the IoT device cannot judge what is specifically referred to by these reference terms without the context information with the IoT device before switching, the IoT device cannot execute appropriate processing.

If all content of the context information for one IoT device is linked among all the IoT devices to be used by the user, the above-described point is eliminated. However, it is not efficient to link context information for one IoT device among all the IoT devices to be used by the user. Therefore, by linking the context information in advance only with an IoT device which is to be operated by the user next, it is possible to avoid the IoT devices which are not to be operated by the user from uselessly holding the context information.

Therefore, the disclosures of the present disclosure have studied hard concerning a technology which enables context information to be efficiently linked among a plurality of IoT devices in view of the above-described points. As a result, the disclosures of the present disclosure have achieved a technology which detects behavior of a user and enables context information to be efficiently linked among a plurality of IoT devices on the basis of the behavior of the user.

The background of the embodiment of the present disclosure has been described above. Subsequently, the embodiment of the present disclosure will be described in detail.

1.2. Configuration Example

First, an overall configuration example of an information processing system according to an embodiment of the present disclosure will be described. FIG. 1 is an explanatory diagram illustrating the overall configuration example of the information processing system 1 according to the embodiment of the present disclosure. FIG. 1 illustrates the overall configuration example of the information processing system 1 in which context information is linked between information processing apparatuses 100 and 200 which are IoT devices, so that processing performed on the information processing apparatus 100 by the user can be taken over to the information processing apparatus 200.

As illustrated in FIG. 1, the information processing system 1 according to the embodiment of the present disclosure is configured to include the information processing apparatuses 100 and 200, a sensor 300, and input/output devices 400a and 400b.

The information processing apparatuses 100 and 200 accept operation input from the user and executes various kinds of information processing according to the operation input. As illustrated in FIG. 1, the information processing apparatus 100 in the information processing system 1 according to the embodiment of the present disclosure is configured to include a control unit 110, a detecting unit 120 and a context information managing unit 130.

The control unit 110, which is a block that controls operation of the information processing apparatus 100, can be configured with, for example, a CPU, a ROM, a RAM, or the like. In the present embodiment, the control unit 110 executes processing of sending out an instruction to the context information managing unit 130 on the basis of an instruction from the detecting unit 120 and selecting an output destination of content from the input/output devices 400a and 400b. Of course, the processing executed by the control unit 110 is not limited to this example.

The detecting unit 120 detects a state of the user who uses the information processing apparatus 100 which is an IoT device. As illustrated in FIG. 1, the detecting unit 120 is configured to include a recognizing unit 122.

The recognizing unit 122 acquires sensing data from a sensor 300 which senses the state of the user who uses the information processing apparatus 100, and detects the state of the user who uses the information processing apparatus 100 on the basis of the sensing data acquired from the sensor 300. While the sensor 300 will be described later, examples of sensors constituting the sensor 300 can include, for example, a sensor which acquires a current location, such as a global positioning system (GPS), a global navigation satellite system (GLONASS), and a BeiDou navigation satellite system (BDS), a camera, a camera with depth information, a human sensor, a microphone, and the like. The sensor 300 detects acceleration and angular velocity relating to the apparatus, azimuth, illuminance, a temperature, an atmospheric pressure, and the like. The above-described various kinds of sensors can detect various kinds of information as information relating to the user, for example, information indicating movement or orientation of the user in a case where, for example, an apparatus including the sensor is carried or worn by the user. Further, the sensor 300 may include a sensor detecting biological information of the user, such as pulse, perspiration, a brain wave, tactile sense, olfactory sense and taste sense, in addition to the above-described sensors.

The recognizing unit 122 detects the state of the user who uses the information processing apparatus 100 on the basis of the sensing data acquired from the sensor 300 and gives a predetermined notification to the control unit 110 on the basis of the detecting result. Here, the notification from the recognizing unit 122 to the control unit 110 is, for example, a notification that the user is likely to use the information processing apparatus 100 on the basis of movement of the location of the user. The control unit 110 then instructs the context information managing unit 130 to acquire context information on the basis of the notification from the recognizing unit 122.

The context information managing unit 130 manages context information. In the present embodiment, the context information managing unit 130 holds content of the context information which is interaction content for the IoT device. Further, in the present embodiment, the context information managing unit 130 executes processing of acquiring context information from another IoT device on the basis of an instruction from the control unit 110. Note that the interaction content for the IoT device includes sound, text, an image, biological data, and other various kinds of input from the user to the IoT device.

Examples of information included in the context information can include, for example, information specifying a user who performs operation, information specifying application used by the user or content browsed by the user, information specifying an execution state of the above-described application, a browsed part of the above-described content, or the like. Of course, the information included in the context information is not limited to these examples.

Further, the context information managing unit 130 stores context information in association with information for uniquely identifying the user (for example, information such as a user ID). By the context information managing unit 130 storing the context information in association with the information for uniquely identifying the user, it is possible to perform processing of specifying a device which holds the context information, and acquiring context information corresponding to the device which holds the context information.

Table 1 is an example of context information managed by the context information managing unit 130. Table 1 indicates an example of the context information in a case where the context information is managed in a unit of user 1D.

TABLE 1

Example of context information)
User ID: 00000001

| Date and time | Recognized word | Output content (such as image, sound and URL) | Location | Acceleration | Feeling | Perspiration | Brain wave | ... |
|---|---|---|---|---|---|---|---|---|
| 10/10 10:10 | abc | xxx | xx | xx | xx | xx | xx | |
| 10/10 10:20 | efg | xxy | xy | xy | xy | xy | xy | |
| 10/10 10:25 | hij | xxz | xx | xz | xx | xx | xz | |
| . | . | . | . | . | . | . | . | |
| . | . | . | . | . | . | . | . | |
| . | . | . | . | . | . | . | . | |

Note that, while FIG. 1 only illustrates a context information managing unit 230 of the information processing apparatus 200, the information processing apparatus 200 can have a similar configuration to that of the information processing apparatus 100.

The sensor 300 senses various states. The information processing apparatus 100 judges a state of the user who uses the information processing apparatus 100 using the sensing data obtained through sensing by the sensor 300. Examples of states of the user judged at the information processing apparatus 100 using the sensing data obtained through sensing by the sensor 300 can include, for example, a direction of movement, movement velocity, or the like, of the user.

The sensor 300 is provided to detect that the user is likely to use the information processing apparatus 100 next by the user approaching the information processing apparatus 100. Further, the sensor 300 is provided to detect that the user is likely to stop using the information processing apparatus 100 by the user leaving from the information processing apparatus 100.

Therefore, the sensor 300 is preferably provided at a location or orientation so that the corresponding information processing apparatus 100 can judge approaching or leaving of the user. Further, while the sensor 300 is preferably provided near the information processing apparatus 100, the sensor 300 may be provided on a migration path of the user to the information processing apparatus 100.

Further, the sensor 300 can be provided not only to detect merely approaching of a person, but also to recognize who is an approaching person. Therefore, as described above, the sensor 300 preferably includes a device which can acquire information for identifying a person, such as a camera and a microphone. Accordingly, for example, if information such as a shape of a person, voice of a person and vibration can be obtained through sensing by the sensor 300, the information processing apparatus 100 can judge an approaching person using the sensing data. Of course, if there is only one user who uses the IoT device, the sensor 300 may have only a function of detecting merely approaching of a person.

By the sensor 300 being provided in this manner, the information processing apparatus 100 can detect approaching of the user. The information processing apparatus 100 then detects approaching of the user by acquiring the sensing data from the sensor 300, acquires context information from another IoT device (for example, the information processing apparatus 200), and thereby can continue interaction with the user.

FIG. 1 illustrates the two information processing apparatuses 100 and 200 which are IoT devices. For example, if the user interacts with the information processing apparatus 200, and the sensor 300 detects that the user approaches the information processing apparatus 100, the information processing apparatus 100 acquires context information from the information processing apparatus 200.

In the present embodiment, a case where an area covered by one IoT device is located next to an area covered by another IoT device or the areas partially overlap with each other will be referred to as "adjacent", and a case where the area covered by one IoT device is not located next to the area covered by another IoT device will be referred to as "approaching". For example, if the user exists at a location where areas covered by a plurality of IoT devices overlap with each other, it is preferable to take into account which IoT device should pick up voice or which IoT device should perform output. In a case where the areas covered by the IoT devices overlap with each other, for example, it is also possible to judge which IoT device should execute processing through image recognition using an image captured with a camera, speech recognition using voice collected with a microphone, or the like. For example, an IoT device which judges that the user faces the front may execute processing as a result of the image recognition or the speech recognition.

Figure 2:
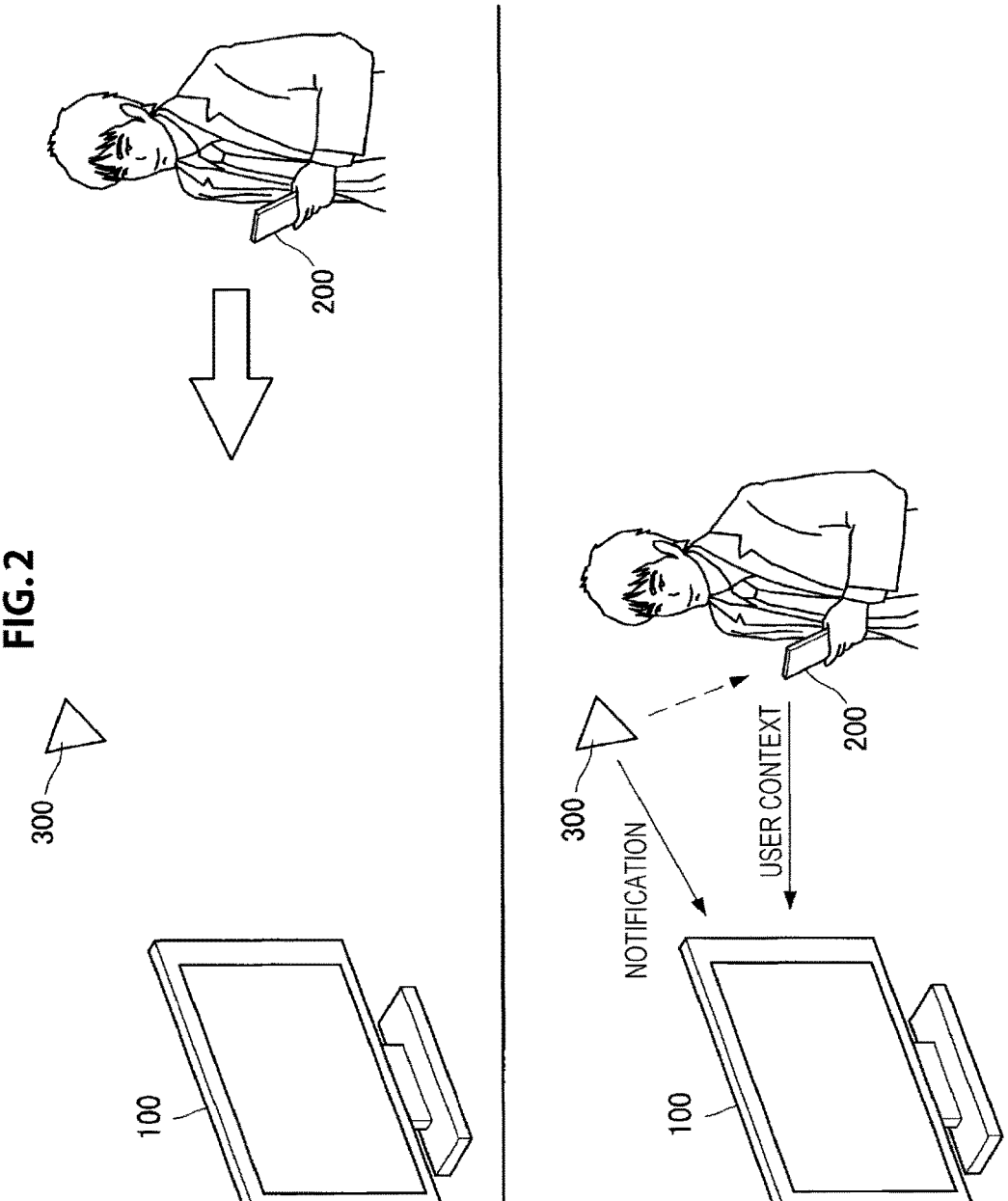
FIG. 2 is an explanatory diagram illustrating outline of operation of an information processing apparatus 100 and an information processing apparatus 200.

FIG. 2 is an explanatory diagram illustrating outline of operation of the information processing apparatus 100 and the information processing apparatus 200. For example, it is assumed that the user interacts with the information processing apparatus 200, and the user moves to a location where the information processing apparatus 100 is placed while moving. If the sensor 300 detects that the user is approaching, the sensor 300 notifies the information processing apparatus 100 of approaching of the user.

When the information processing apparatus 100 receives the notification from the sensor 300, the information processing apparatus 100 judges that the user is approaching and acquires context information from the information processing apparatus 200. The information processing apparatus 100 can take over interaction performed by the user on the information processing apparatus 200 by acquiring the context information from the information processing apparatus 200.

Note that, in the following description, the information processing apparatus 200 illustrated in the example in FIG. 2 will be also referred to as an "approaching IoT device", and the information processing apparatus 100 will be also referred to as an "approached IoT device".

Here, in a case where the information processing apparatus 100 and the information processing apparatus 200 are located within such a range that the apparatuses can directly perform communication with each other, the information processing apparatus 100 can directly acquire context information from the information processing apparatus 200. On the other hand, in a case where the information processing apparatus 100 and the information processing apparatus 200 are not located within such a range that the apparatuses can directly perform communication with each other, the information processing apparatus 100, for example, acquires context information from a cloud server 10. Therefore, both the information processing apparatuses 100 and 200 have a function of transmitting context information to the cloud server 10 and receiving context information from the cloud server 10.

While, in the present embodiment, all the held context information may be transmitted from the approaching IoT device to the approached IoT device, if all the context information is transmitted, it takes time to perform transmission according to an amount of the context information, and there is a possibility that the context information cannot be transmitted before interaction processing is started at the approached IoT device. Therefore, only part of the held context information may be transmitted from the approaching IoT device to the approached IoT device.

Examples of the part of the context information to be transmitted by the approaching IoT device include, for example, recently generated context information, context information which is just constituted by past context information and context information which is considered as optimal on the basis of a current user situation, and the like. Examples of the current user situation include time, a location, a person with whom the user stays together, or the like. The current user situation is, for example, judged by the approaching IoT device from the sensing data obtained by the sensor 300.

Whether or not the information processing apparatus 100 and the information processing apparatus 200 are located within such a range that the apparatuses can directly perform communication with each other may be judged by, for example, detecting strength of a radio wave to be used by the information processing apparatus 200 for radio communication. That is, the information processing apparatus 100 may judge that the information processing apparatus 100 is not located within such a range that the information processing apparatus 100 can directly communicate with the information processing apparatus 200 in a case where no radio wave is detected from the information processing apparatus 200 or even if a radio wave is detected, the strength is less than a predetermined value.

Note that, while a radio wave in a frequency band used in, for example, Wi-Fi or Bluetooth (registered trademark) can be used as a radio wave to be used by the information processing apparatus 200 for radio communication, the radio wave is not limited to a radio wave in a specific band or with specific strength.

By acquiring context information managed by the information processing apparatus 200 directly from the information processing apparatus 200 or by way of the cloud server 10 in this manner, the information processing apparatus 100 can take over interaction performed by the user on the information processing apparatus 200.

Note that, while, in the configuration example illustrated in FIG. 1, an example has been described where the input/output devices 400a and 400b which output content or accept input from the user are provided at the information processing system 1 separately from the information processing apparatus 100, the present disclosure is not limited to this example, and the information processing apparatus 100 may be configured to output content or accept input from the user.

In a case where input of voice or an image from the user can be obtained at a plurality of input/output devices 400a and 400b, the information processing apparatus 100 employs input with the best quality among the input. Further, in a case where there are a plurality of input/output devices 400a and 400b as a candidate for an output destination, the information processing apparatus 100 may, for example, set all the input/output devices 400a and 400b as the output destination or may allow the user to designate the output destination.

The overall configuration example of the information processing system 1 according to the embodiment of the present disclosure has been described above using FIG. 1. Subsequently, an operation example of each apparatus constituting the information processing system 1 according to the embodiment of the present disclosure will be described.

Figure 3:
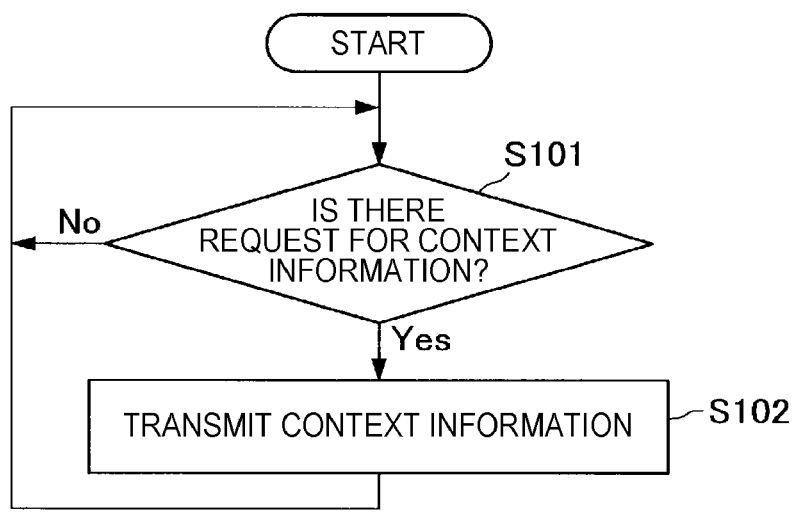
FIG. 3 is a flowchart illustrating an operation example.
Figure 4:
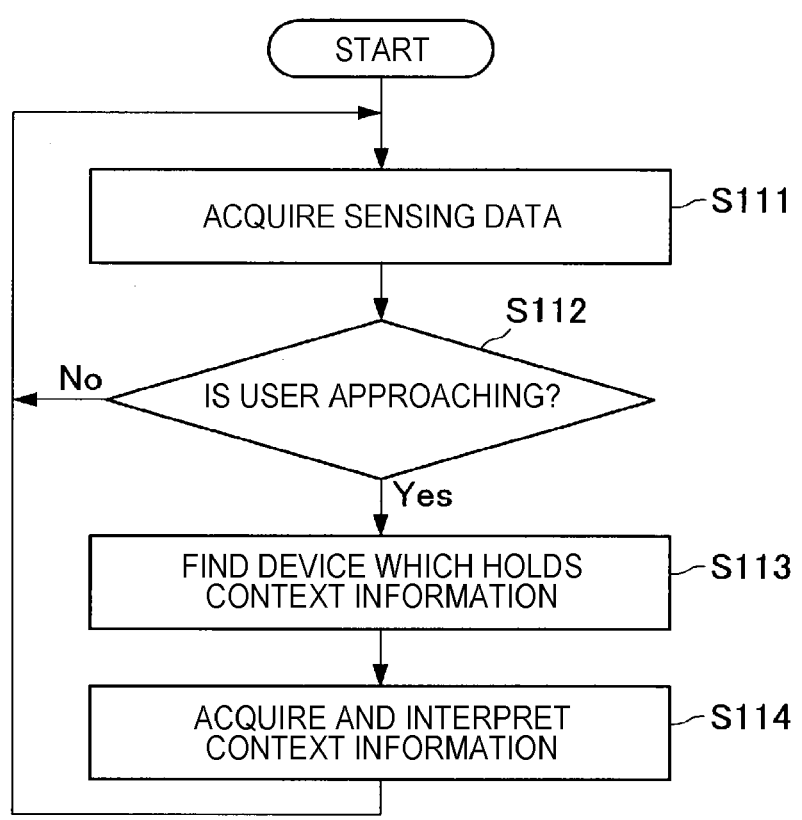
FIG. 4 is a flowchart illustrating an operation example.
Figure 5:
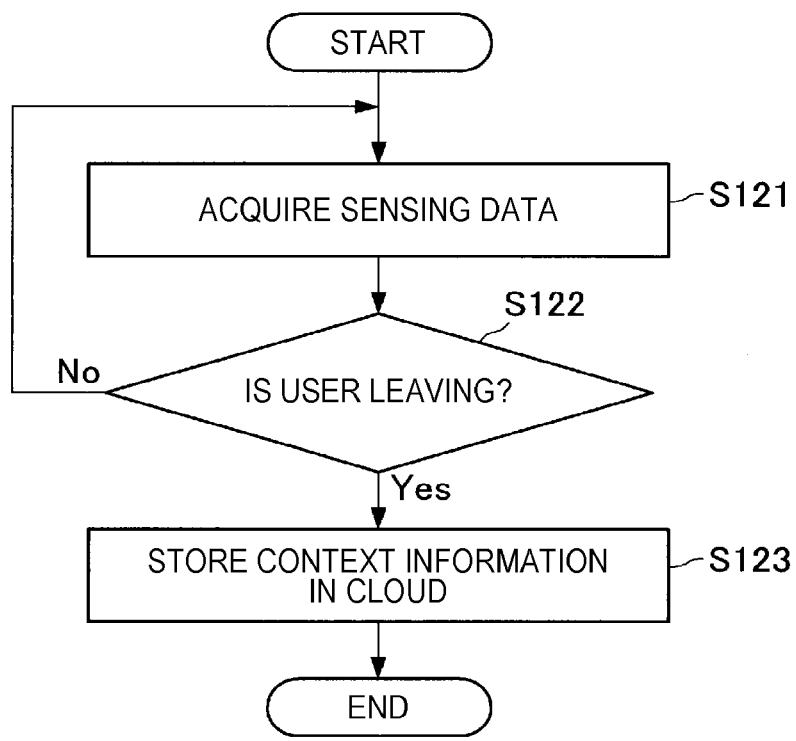
FIG. 5 is a flowchart illustrating an operation example.

First, operation of each apparatus constituting the information processing system 1 according to the embodiment of the present disclosure will be schematically described using FIG. 3 to FIG. 5.

FIG. 3 is a flowchart illustrating an operation example of the information processing system 1 according to the embodiment of the present disclosure and an operation example of the approaching IoT device (for example, the information processing apparatus 200 in FIG. 2). The operation example of the approaching IoT device in the information processing system 1 according to the embodiment of the present disclosure will be described below using FIG. 3.

The approaching IoT device judges whether or not there is a request for context information from another IoT device (step S101), and if there is a request for context information from another IoT device (step S101: Yes), the approaching IoT device transmits the context information to the IoT device which transmits the request for context information (step S102)

If there is no request for context information from another IoT device (step S101: No), the approaching IoT device stands by until there is a request for context information from another IoT device.

The operation example of the approaching IoT device in the information processing system 1 according to the embodiment of the present disclosure has been described above using FIG. 3. Note that the approaching IoT device may transmit the context information to the cloud server 10 instead of directly transmitting the context information to another IoT device.

FIG. 4 is a flowchart illustrating an operation example of the information processing system 1 according to the embodiment of the present disclosure and an operation example of the approached IoT device (for example, the information processing apparatus 100 in FIG. 2). The operation example of the approached IoT device in the information processing system 1 according to the embodiment of the present disclosure will be described below using FIG. 4.

The approached IoT device acquires sensing data from the sensor 300 (step S111), and judges whether or not the user is approaching on the basis of the sensing data acquired from the sensor 300 (step S112).

Here, there are various methods for judging whether or not the user is approaching, performed by the approached IoT device, and the method is not limited to a specific method. For example, if the acquired sensing data includes an image captured with a camera, and the face of a person becomes larger with time, it is possible to judge that the person comes closer to the camera. Further, for example, if the acquired sensing data includes an image captured with a camera, and the back side of the head of a person becomes smaller with time, it is possible to judge that the person comes closer from the camera.

Further, if only a specific user is to be detected, for example, it is possible to judge whether or not the user to be detected is approaching not only by judging whether or not the image is such an image that the face of the person becomes larger with time, but also by judging whether or not the detected face is the face of the user to be detected.

As a result of the above-described judgement in step S112, in a case where it is judged that the user is not approaching (step S112: No), the approached IoT device returns to the above-described processing of acquiring the sensing data in step S111.

On the other hand, as a result of the above-described judgment in step S112, in a case where it is judged that the user is approaching (step S112: Yes), the approached IoT device then finds a device which holds context information (step S113), acquires the context information from the device which holds the context information and executes interpretation of the context information (step S114).

The operation example of the approached IoT device in the information processing system 1 according to the embodiment of the present disclosure has been described above using FIG. 4. Note that the approached IoT device may receive the context information from the cloud server 10 instead of directly receiving the context information from the approaching IoT device.

FIG. 5 is a flowchart illustrating an operation example of the information processing system 1 according to the embodiment of the present disclosure and an operation example of the approached IoT device (for example, the information processing apparatus 100 in FIG. 2). FIG. 5 illustrates an operation example in a case where the user is leaving from the approached IoT device. The operation example of the approaching IoT device in the information processing system 1 according to the embodiment of the present disclosure will be described below using FIG. 5.

The approached IoT device acquires the sensing data from the sensor 300 (step S121). The approached IoT device judges whether or not the user is leaving from the approached IoT device on the basis of the sensing data acquired from the sensor 300 (step S122).

As a result of the above-described judgement in step S122, in a case where it is judged that the user is not leaving (step S122: No), the approached IoT device returns to the above-described processing of acquiring the sensing data in step S121.

On the other hand, as a result of the above-described judgement in step S122, in a case where it is judged that the user is leaving (step S122: Yes), the approached IoT device then stores context information in the cloud server 10 (step S123)

The operation example of the approached IoT device in the information processing system 1 according to the embodiment of the present disclosure has been described above using FIG. 5.

Each apparatus constituting the information processing system 1 according to the embodiment of the present disclosure transmits context information or stores context information in the cloud server 10 by being triggered by approaching or leaving of the user in this manner.

Operation of the approached IoT device constituting the information processing system 1 according to the embodiment of the present disclosure will be described in detail next. First, an operation example of the approached IoT device in a case where context information is exchanged via the cloud server 10 will be described.

Figure 6:
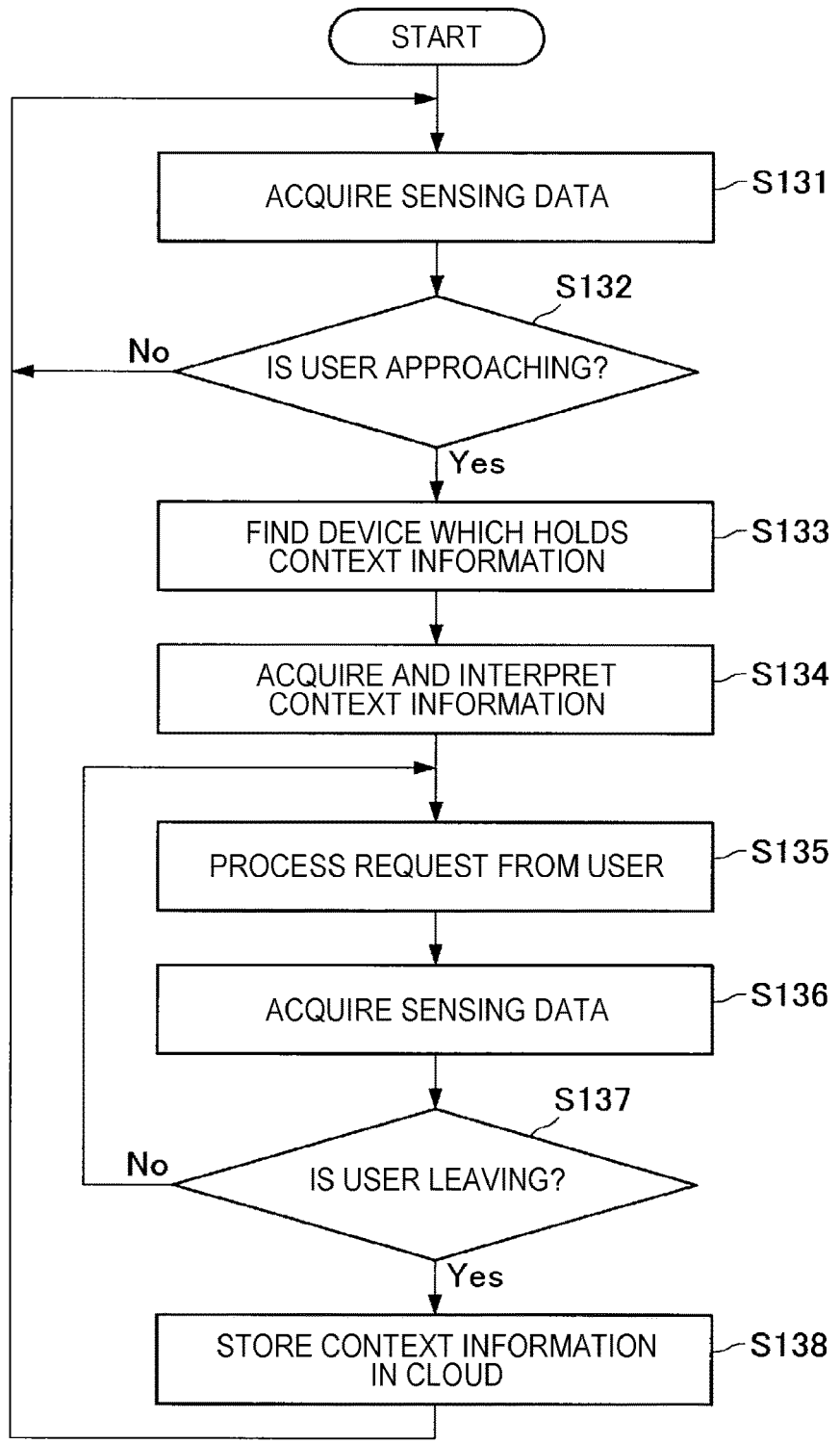
FIG. 6 is a flowchart illustrating an operation example.

FIG. 6 is a flowchart illustrating an operation example of the approached IoT device constituting the information processing system 1 according to the embodiment of the present disclosure. FIG. 6 illustrates an operation example of the approached IoT device in the case where context information is exchanged via the cloud server 10. An operation example of the approached IoT device constituting the information processing system 1 according to the embodiment of the present disclosure will be described below using FIG. 6.

The approached IoT device acquires sensing data from the sensor 300 (step S131) and judges whether or not the user is approaching on the basis of the sensing data acquired from the sensor 300 (step S132)

As a result of the above-described judgement in step S132, in a case where it is judged that the user is not approaching (step S132: No), the approached IoT device returns to the above-described processing of acquiring the sensing data in step S131.

On the other hand, as a result of the above-described judgment in step S132, in a case where it is judged that the user is approaching (step S132: Yes), the approached IoT device then finds a device which holds the context information (step S133), acquires the context information from the device which holds the context information and executes interpretation of the context information (step S134). In this event, the approached IoT device receives the context information from the cloud server 10.

The approached IoT device processes a request from the user using the context information acquired from the approaching IoT device (step S135).

The approached IoT device then acquires sensing data from the sensor 300 (step S136) and judges whether or not the user is leaving from the approached IoT device on the basis of the sensing data acquired from the sensor 300 (step S137).

As a result of the above-described judgment in step S137, in a case where it is judged that the user is not leaving (step S137: No), the approached IoT device returns to the above-described processing of processing a request from the user in step S135.

On the other hand, as a result of the above-described judgement in step S137, in a case where it is judged that the user is leaving (step S137: Yes), the approached IoT device then stores the context information in the cloud server 10 (step S138).

The approached IoT device may be put into a sleep state before a series of processing illustrated in FIG. 6 is executed. Then, when the approached IoT device detects approaching of the user, the sleep state is released, and the state shifts to a mode in which normal operation is performed.

The operation example of the approached IoT device constituting the information processing system 1 according to the embodiment of the present disclosure has been described above using FIG. 6. By executing a series of operation as illustrated in FIG. 6, the approached IoT device can exchange the context information with the approaching IoT device via the cloud server 10. Then, by executing a series of operation as illustrated in FIG. 6, the approached IoT device can continue interaction processing by acquiring the context information from the approaching IoT device via the cloud server 10 and taking over interaction processing performed by the user until then.

An operation example of the approached IoT device in a case where the context information is directly exchanged without involving the cloud server 10 will be described next.

Figure 7:
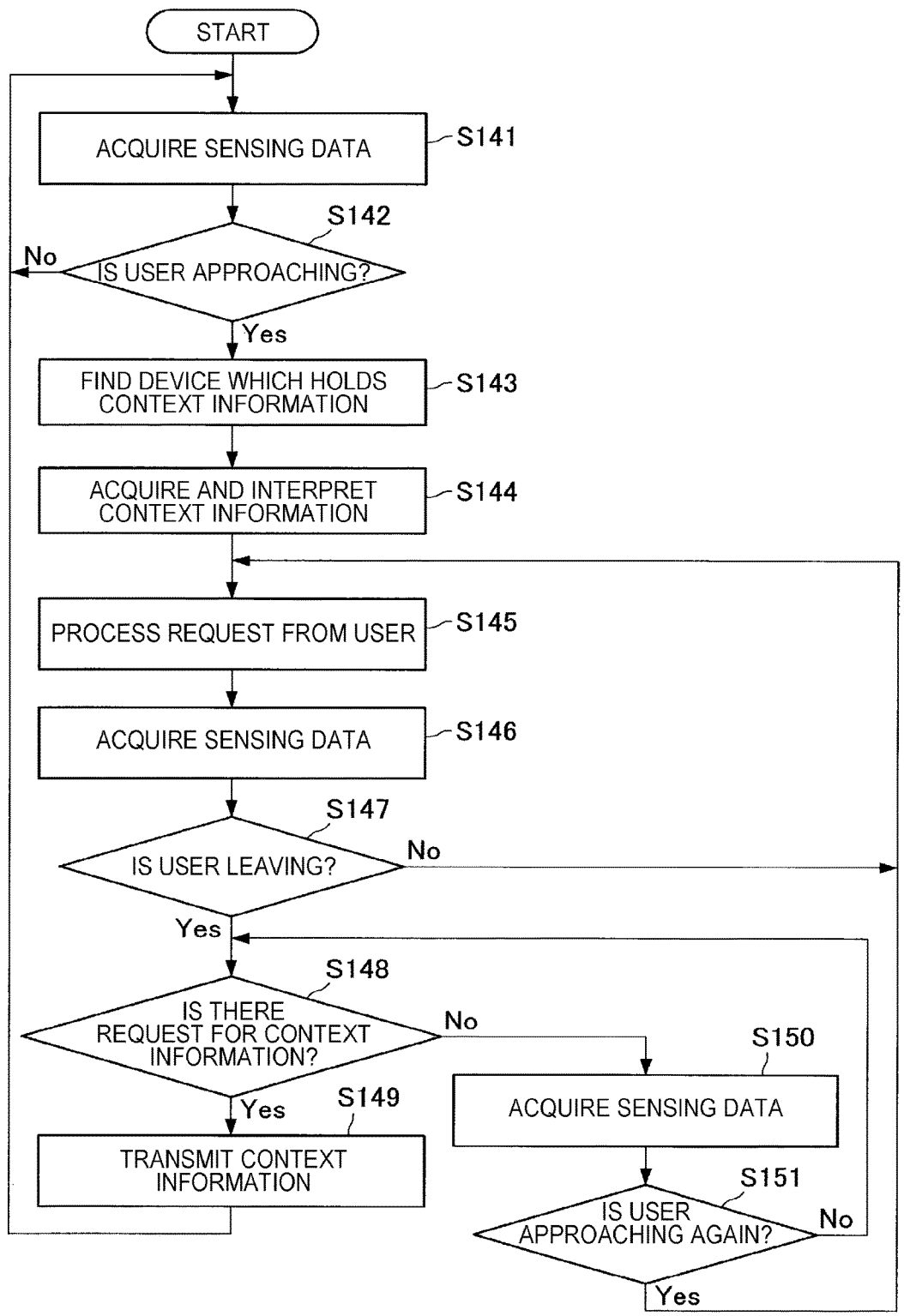
FIG. 7 is a flowchart illustrating an operation example.

FIG. 7 is a flowchart illustrating an operation example of the approached IoT device constituting the information processing system 1 according to the embodiment of the present disclosure. FIG. 7 illustrates an operation example of the approached IoT device in the case where the context information is directly exchanged without involving the cloud server 10. The operation example of the approached IoT device constituting the information processing system 1 according to the embodiment of the present disclosure will be described below using FIG. 7.

The approached IoT device acquires sensing data from the sensor 300 (step S141) and judges whether or not the user is approaching on the basis of the sensing data acquired from the sensor 300 (step S142).

As a result of the above-described judgement in step S142, in a case where it is judged that the user is not approaching (step S142: No), the approached IoT device returns to the above-described processing of acquiring the sensing data in step S141.

On the other hand, as a result of the above-described judgment in step S142, in a case where it is judged that the user is approaching (step S142: Yes), the approached IoT device then finds a device which holds the context information (step S143), acquires the context information from the device which holds the context information and executes interpretation of the context information (step S144).

The approached IoT device processes a request from the user using the context information acquired from the approaching IoT device (step S145).

Then, the approached IoT device acquires sensing data from the sensor 300 (step S146) and judges whether or not the user is leaving from the approached IoT device on the basis of the sensing data acquired from the sensor 300 (step S147)

As a result of the above-described judgment in step S147, in a case where it is judged that the user is not leaving (step S147: No), the approached IoT device returns to the above-described processing of processing a request from the user in step S145.

On the other hand, as a result of the above-described judgment in step S147, in a case where it is judged that the user is leaving (step S147: Yes), the approached IoT device subsequently judges whether or not there is a request for the context information from another IoT device (step S148)

As a result of the above-described judgment in step S148, in a case where there is a request for the context information from another IoT device (step S148: Yes), the approached IoT device transmits the context information to the IoT device which transmits the request for the context information (step S149).

On the other hand, in a case where there is no request for the context information from another IoT device (step S148: No), the approached IoT device acquires sensing data from the sensor 300 (step S150) and judges whether or not the user who leaves once is approaching again on the basis of the sensing data acquired from the sensor 300 (step S151).

As a result of the above-described judgment in step S151, in a case where it is judged that the user is not approaching again (step S151: No), the approached IoT device returns to the above-described processing of judging whether or not there is a request for the context information in step S148. On the other hand, as a result of the above-described judgment in step S151, in a case where it is judged that the user is approaching again (step S151: Yes), the approached IoT device returns to the above-described processing of processing a request from the user in step S145 and executes subsequent processing.

Note that, when the approached IoT device detects leaving of the user, the approached IoT device may be put into a sleep state from a mode in which normal operation is performed.

The operation example of the approached IoT device constituting the information processing system 1 according to the embodiment of the present disclosure has been described above using FIG. 7. By executing a series of operation as illustrated in FIG. 7, the approached IoT device can exchange the context information with the approaching IoT device without involving the cloud server 10. By executing a series of operation as illustrated in FIG. 7, the approached IoT device can continue interaction processing by directly acquiring the context information from the approaching IoT device without involving the cloud server 10 and taking over the interaction processing performed by the user until then.

As described above, in the information processing system 1 according to the embodiment of the present disclosure, the IoT device can acquire context information from another IoT device by detecting approaching of the user and executing processing of requesting the context information to the another IoT device on the basis of the approaching of the user.

Note that, in a case where there is surely a request for the context information, but a device which requests the context information is unclear, or in a case where there are a plurality of devices which request the context information, the approaching IoT device may broadcast the context information to one or two or more IoT devices which can be candidates for devices which request the context information. As a method for determining IoT devices which can be candidates, there is, for example, a method in which information of an adjacent or approaching IoT device is acquired from a current location, and the adjacent or approaching IoT device is determined as a candidate for the device which requests the context information.

Here, interaction processing with the user by the IoT device will be described. The IoT device may detect "start of interaction" by, for example, always monitoring microphone input and responding to a specific keyword in order to judge that the user desires interaction processing or judge that the user starts interaction. For example, when a predetermined keyword is uttered, the IoT device may start acceptance of a command by voice.

Note that the IoT device may, for example, detect approaching or presence of the user using the sensor 300 and start monitoring of microphone input.

While, in the present embodiment, the sensor 300 detects approaching of the user, and the approached IoT device acquires the context information from the approaching IoT device, the present disclosure is not limited to this example. For example, the sensor 300 detects movement of the user who uses the approaching IoT device and detects a direction of the movement of the user on the basis of the movement of the user. Then, the approaching IoT device may select an approached IoT device that the user approaches next on the basis of the direction of the movement of the user. The approaching IoT device then transmits information after selecting an approached IoT device that the user approaches next.

Further, a rule for enabling specification of an IoT device around which the user is to appear in accordance with the sensing data acquired from the sensor 300 may be registered in each IoT device. For example, a rule defining correspondence relationship such that, if one sensor senses approaching of a person in order of A, B, an IoT device that the person approaches next is this IoT device may be registered in each IoT device.

Further, it is also possible to cause each IoT device to gradually learn a rule for associating order the sensor 300 senses a person with IoT devices through machine learning, or the like. For example, it is also possible to cause each IoT device to learn such a rule that if the sensor detects approaching of a person in a pattern of given order, this IoT device is highly likely to be used after that.

Further, other than the above-described examples, it is also possible to create a list in which identification information such as an IP address of each IoT device is associated with an actual location, and, if a sensor reacts, pass context information to a specific IoT device corresponding to the location of the sensor.

As the simplest method, an approached IoT device that the user approaches next may not be specified. That is, a person who installs the IoT device designates all adjacent IoT devices. The approaching IoT device may transfer context to all these IoT devices.

The information processing system according to the present embodiment is particularly beneficial in the following cases.

For example, the information processing system is beneficial in a case where the user who watches video with an IoT device (for example, a personal computer) placed in a living room moves to another room and utters that "please show me the rest of the video I watched a little while ago" to an IoT device in that room. In this case, the IoT device in that room acquires context information from the IoT device placed in the living room and can reproduce the rest of the same video with reference to the context information by utterance of the user without the need of logon processing of the user.

Further, for example, the information processing system is beneficial in a case where the user watches a cooking program with an IoT device (for example, TV) and says "download the recipe" to the IoT device. In this case, the IoT device downloads the recipe. When the user moves to a kitchen, an IoT device (for example a tablet type terminal) placed at the kitchen acquires context information from the IoT device which has downloaded the recipe through movement of the user. When the user utters "show me the recipe downloaded a little while ago" to the IoT device placed at the kitchen, the IoT device placed at the kitchen can display the recipe downloaded by another IoT device with reference to the context information without the need of logon processing of the user.

Further, for example, it is possible to specify a given user ID and user IDs of close relatives (such as, for example, father, mother, brother and sister) of the user corresponding to the user ID, extract context information associated with these user IDs, and continue interaction based on utterance given by the close relatives to the IoT device until then. For example, if a given user asks the IoT device "did my father say anything about where he wants to travel a little while ago?", the IoT device which is asked can create a response by specifying a user ID of "father" and extracting content relating to travel from the context information associated with the user ID.

As described above, the approached IoT device can directly or indirectly acquire the context information from the approaching IoT device. Here, the approaching IoT device may store the context information for a while taking into account a case where the user does not actually approach the approached IoT device, a case where some trouble occurs at the approached IoT device, or the like. Further, if it is extremely highly required to avoid loss of the context information, the approaching IoT device may store the context information in a server at home, a cloud server, or the like.

Of course, the approached IoT device may store the context information for a while after acquiring the context information from the approaching IoT device.

While all data of the context information may be transmitted from the approaching IoT device to the approached IoT device, in a case where an amount of the data is enormous, and the data cannot be transmitted in time, or the like, it is also possible to transmit only an amount of data required for processing to be executed by the approached IoT device from the approaching IoT device to the approached IoT device.

Further, in the case where an amount of the context information is enormous and the data cannot be transmitted in time, the approaching IoT device may transmit information required for continuing interaction processing at the approached IoT device first, and transmit the rest of the information in the background after the approached IoT device starts interaction processing again.

For example, in a case where the context information includes video data itself which is being browsed, that is, in a case where the substance of a content file only exists in the approaching IoT device, it is also possible to stream the content from the approaching IoT device to the approached IoT device.

Further, for example, it is also possible to commit only part of processing itself (interaction processing, arithmetic processing, knowledge processing and other processing) to other IoT devices. That is, while main part of the processing continues to run on a server (or a terminal nearest from the user), it is also possible to cause the processing to follow the user through coordination with peripheral IoT devices. By such commitment, it is possible to limit context information to be transmitted to only part of the information. Hereinafter, this scheme will be also referred to as a "distributed agent scheme".

In a case of the "distributed agent scheme", it is preferable to set an IoT device to which the processing is to be committed and a processing time limit of the committed processing, and appropriately set the context information and which IoT device should perform the committed processing.

There can be also a case where the context information cannot be transmitted from the approaching IoT device to the approached IoT device in time, or a case where transmission of the context information fails. That is, there is a case where the user starts interaction processing on the approached IoT device in the process of transmission of the context information from the approaching IoT device to the approached IoT device.

In a case where the context information cannot be transmitted from the approaching IoT device to the approached IoT device in time, or in a case where transmission of the context information fails, the approaching IoT device and the approached IoT device, for example, perform the following processing.

For example, the approaching IoT device and the approached IoT device may keep the user waiting until transferring of the context information is finished. Further, if possible, the approached IoT device may resume interaction processing using only partial context information which has been transmitted and transfer the rest of the context information in the background. Further, the approached IoT device may give up taking over of the context information from the approaching IoT device, and the approached IoT device may ask the user anew.

There can be also a case where interaction between the IoT device and the user is cut off for a predetermined period. In the case where the interaction between the IoT device and the user is cut off for a predetermined period, the IoT device may return the state to an initial state, that is, a state where there is no context information. When the state returns to the initial state, the IoT device may store context information itself until then, so that the interaction can be resumed any time. That is, the IoT device can resume interaction processing, for example, like "concerning the case of the travel discussed last week", "speaking of which, you are searching an accommodation" with the user by storing the context information itself.

There can be also a case where the user does not desire to perform continuous interaction with the IoT device. The IoT device can define a specific keyword for resetting the interaction processing until then taking into account the case where the user does not desire to perform continuous interaction with the IoT device. For example, when the user utters the above-described specific keyword again, the IoT device may return the state to a state before the interaction processing with the user is started. Further, if the user utters a keyword dedicated for changing the subject such as "by the way", the IoT device may return the state to a state before the interaction processing with the user is started.

In the case where interaction processing is reset in this manner, the IoT device may store the context information itself until then, so that interaction can be resumed any time.

When the approached IoT device acquires context information from the approaching IoT device, the approached IoT device may acquire temporally new context information when acquiring context information for the first time and may acquire past data when the user designates content indicating time. For example, while the approached IoT device acquires temporally new context information when acquiring the context information for the first time, if the user designates content indicating time such as "one week ago", the approached IoT device may acquire context information one week ago which is designated from the approaching IoT device or the cloud server 10.

While the above-described series of processing are described in the case where the approached IoT device acquires the context information from the approaching IoT device, inversely, the above-described series of processing can be also applied in a similar manner to a case where so-called push transmission of the context information is performed from the approaching IoT device to the approached IoT device.

That is, the approaching IoT device may determine an approached IoT device which is to be operated by the user next by receiving sensing data from the sensor 300 and estimating a direction of movement of the user from the sensing data, and may transmit context information to the approached IoT device. If the approached IoT device stops operation, the approaching IoT device may transmit the context information after transmitting a command for activating the approached IoT device.

Further, in a case where the approaching IoT device further detects movement of the user after receiving the context information from the approached IoT device, the approaching IoT device may transmit the received context information to another IoT device which is considered to be located in the direction of movement of the user. After the approaching IoT device transmits the received context information to another IoT device, the approaching IoT device may delete the context information received from the approached IoT device.

2. Exemplary Hardware Configuration

Figure 8:
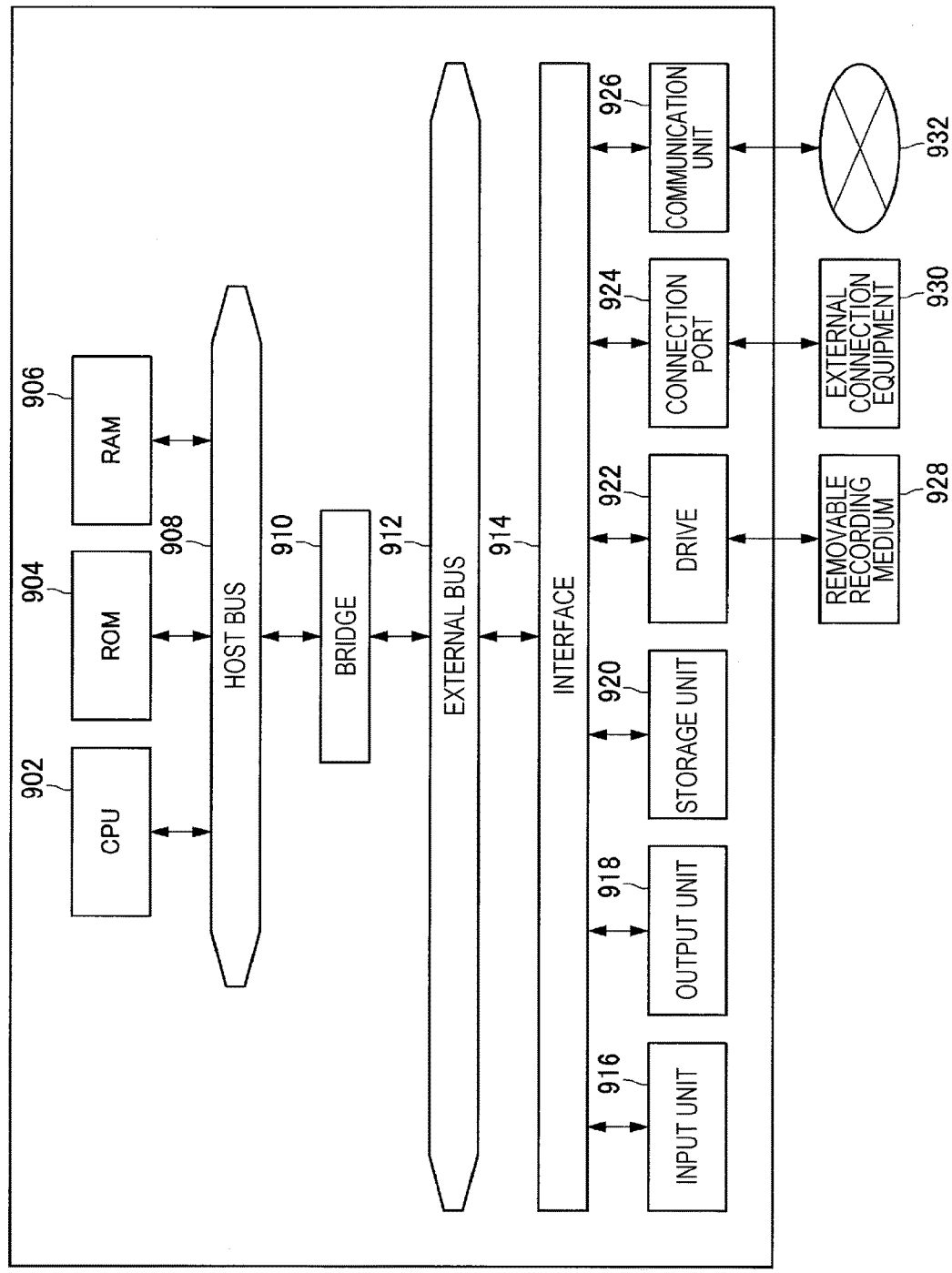
FIG. 8 is a block diagram illustrating a hardware configuration example.

The hardware configuration of the information processing apparatus 100 according to the embodiment of the present disclosure is described with reference to FIG. 8. FIG. 8 is a block diagram illustrating an exemplary hardware configuration of the information processing apparatus 100 according to the embodiment of the present disclosure. Each of the algorithms described above can be implemented by using, in one example, the hardware configuration of the information processing apparatus shown in FIG. 8. That is, the processing of each of the algorithms can be implemented by controlling the hardware shown in FIG. 8 using a computer program. Moreover, this hardware has an optional configuration, and examples thereof include a personal computer, a portable information terminal such as mobile phone, PHS, and PDA, a game console, a contact or contactless IC chip, a contact or contactless IC card, a loudspeaker, a television, a monitor, a wearable device, or various types of home information appliances. PHS is an abbreviation for Personal Handy-phone System, and PDA is an abbreviation for Personal Digital Assistant.

As illustrated in FIG. 8, this hardware mainly includes a CPU 902, a ROM 904, a RAM 906, a host bus 908, and a bridge 910. This hardware further includes an external bus 912, an interface 914, an input unit 916, an output unit 918, a storage unit 920, a drive 922, a connection port 924, and a communication unit 926. CPU is an abbreviation for Central Processing Unit, ROM is an abbreviation for Read Only Memory, and RAM is an abbreviation for Random Access Memory.

The CPU 902 functions as an operation processing unit or a control unit, and controls the entire operation or a portion of the operation of each component on the basis of various programs recorded on the ROM 904, the RAM 906, the storage unit 920, or a removable recording medium 928. The ROM 904 is a device for storing, in one example, a program to be read by the CPU 902 or data used for an operation. The RAM 906 is a memory that temporarily or permanently stores a program to be read by the CPU 902 or various parameters appropriately changed in execution of the program, for example.

These components are connected to each other, in one example, over the host bus 908 allowing high-speed data transmission. On the other hand, the host bus 908 is connected to the external bus 912 having relatively low data transmission speed via the bridge 910, in one example. Furthermore, examples of the input unit 916 include a mouse, a keyboard, a touch panel, a button, a switch, or a lever. Furthermore, an example of the input unit 916 may include a remote controller allowing transmission of a control signal using an infrared ray or other radio waves.

The output unit 918 is a device allowing visual or auditory notification of acquired information to a user, and examples thereof include a display device such as CRT, LCD, PDP, and ELD, an audio output device such as speakers or headphones, a printer, a mobile phone, and a facsimile. CRT is an abbreviation for Cathode Ray Tube, LCD is an abbreviation for Liquid Crystal Display, PDP is an abbreviation for Plasma Display Panel, and ELD is an abbreviation for Electro-Luminescence Display.

The storage unit 920 is a device used to store various data. Examples of the storage unit 920 include a magnetic storage device such as hard disk drive (HDD), a semiconductor storage device, an optical storage device, and a magneto-optical storage device. HDD is an abbreviation for Hard Disk Drive.

The drive 922 is a device that reads information recorded on the removable recording medium 928 such as a magnetic disk, an optical disc, a magneto-optical disc, and a semiconductor memory, or writes information in the removable recording medium 928, in one example. Examples of the removable recording medium 928 include a DVD medium, a Blu-ray medium, an HD-DVD medium, and various types of semiconductor storage media. Of course, the removable recording medium 928 may be, for example, an electronic device or an IC card on which a contactless IC chip is mounted. IC is an abbreviation for Integrated Circuit.

Examples of the connection port 924 include a USB port, an IEEE1394 port, a SCSI, an RS-232C port, and a port for connecting an externally connected device 930 such as an optical audio terminal. Examples of the externally connected device 930 include a printer, a mobile music player, a digital camera, a digital video camera, and an IC recorder. USB is an abbreviation for Universal Serial Bus, and SCSI is an abbreviation for Small Computer System Interface.

The communication unit 926 is a communication device used to be connected to a network 932, and examples thereof include a communication card for a wired or wireless LAN, Bluetooth (registered trademark), or WUSB, an optical communication router, an ADSL router, and a device for contact or contactless communication. In addition, the network 932 connected to the communication unit 926 is configured from a wire-connected or wirelessly connected network, and examples thereof include the Internet, a home-use LAN, infrared communication, visible light communication, broadcasting, and satellite communication. LAN is an abbreviation for Local Area Network, WUSB is an abbreviation for Wireless USB, and ADSL is an abbreviation for Asymmetric Digital Subscriber Line.

The exemplary hardware configuration of the information processing apparatus 100 has been illustrated. Each of the above components may be implemented using general-purpose members, but may also be implemented in hardware specialized in the function of each component. Such a configuration may be modified as appropriate in accordance with the technological level at the time of the implementation.

3. Conclusion

As described above, according to the embodiment of the present disclosure, there is provided the information processing apparatus 100 which detects approaching of the user and acquires context information which is processing content between the user and another apparatus from the another apparatus on the basis of the approaching of the user.

The information processing apparatus 100 according to the embodiment of the present disclosure can take over processing (interaction processing) performed between another apparatus and the user by acquiring context information from the another apparatus on the basis of approaching of the user.

Further, according to the embodiment of the present disclosure, there is provided the information processing apparatus 200 which provides context information to another apparatus on the basis of a request for the context information from the another apparatus which detects approaching of the user.

The information processing apparatus 200 according to the embodiment of the present disclosure can hand over processing (interaction processing) performed between the own apparatus and the user to another apparatus by providing context information to the another apparatus on the basis of a request for the context information from the another apparatus which detects approaching of the user.

Steps in a process executed by each device in this specification are not necessarily executed chronologically in the order described in a sequence chart or a flow chart. In one example, steps in a process executed by each device may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, the configuration of each functional block shown in functional block diagrams in hardware makes it possible to implement the series of processes by hardware.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing apparatus including:

a control unit configured to perform control to detect leaving of a user from the information processing apparatus and transmit at least part of context information exchanged with the user until then to another apparatus.

(2)

The information processing apparatus according to (1), wherein the control unit performs control to directly transmit the context information to the another apparatus.

(3)

The information processing apparatus according to (1), wherein the control unit performs control to transmit the context information to the another apparatus via a server apparatus.

(4)

The information processing apparatus according to any of (1) to (3), wherein the control unit detects a direction of movement of the user from the information processing apparatus.

(5)

The information processing apparatus according to any of (1) to (4), wherein the control unit detects an apparatus which holds the context information using a user ID and extracts the context information.

(6)

The information processing apparatus according to (5), wherein the control unit extracts the context information based on the user ID.

(7)

The information processing apparatus according to (5), wherein the control unit extracts the context information based on another user ID different from the user ID.

(8)

The information processing apparatus according to any of (1) to (7), wherein the control unit detects the direction of the movement of the user by detecting behavior of the user on the basis of sensing data.

(9)

The information processing apparatus according to (8), wherein the control unit detects the direction of the movement of the user by detecting the behavior of the user using an image captured with an imaging apparatus.

(10)

The information processing apparatus according to any of (1) to (9), wherein the control unit performs control to transmit the context information generated in a partial time slot.

The information processing apparatus according to any of (1) to (10), wherein the control unit determines a transmission destination of the context information using information in which an apparatus is associated with a location of the apparatus.

(12)

The information processing apparatus according to any of (1) to (10), wherein the control unit broadcasts the context information to possible apparatuses in a case where a transmission destination of the context information is not uniquely determined.

(13)

The information processing apparatus according to any of (1) to (12), wherein the context information is information based on voice input by the user.

(14)

An information processing apparatus including:

a control unit configured to perform control to detect approaching of a user to the information processing apparatus and receive at least part of context information exchanged with the user until then from another apparatus.

(15)

The information processing apparatus according to (14), wherein the control unit performs control to directly receive the context information from the another apparatus with which the user interacts until then.

(16)

The information processing apparatus according to (14) or (15), wherein the control unit performs control to receive the context information from the another apparatus with which the user interacts until then via a server apparatus.

(17)

The information processing apparatus according to any of (14) to (16), wherein the control unit detects a direction of movement of the user by detecting behavior of the user on the basis of sensing data.

(18)

The information processing apparatus according to (17), wherein the control unit detects the direction of the movement of the user by detecting the behavior of the user using an image captured with an imaging apparatus.

(19)

The information processing apparatus according to any of (14) to (18), wherein the control unit performs control to receive the context information generated in a partial time slot.

(20)
The information processing apparatus according to any of (14) to (19),
wherein the control unit determines an apparatus from which the context information is received using information in which an apparatus is associated with a location of the apparatus.
(21)
The information processing apparatus according to any of (14) to (20),
wherein, when movement of the user is additionally detected, the control unit performs control to transmit at least part of the context information to another apparatus located in the detected direction of the movement.
(22)
The information processing apparatus according to (21),
wherein the control unit performs control to delete the received context information when movement of the user is detected before interaction with the user.
(23)
The information processing apparatus according to any of (14) to (22),
wherein the context information is information based on voice input by the user.
(24)
An information processing method including:
performing control to detect leaving of a user from an information processing apparatus and transmit at least part of context information exchanged with the user until then to another apparatus.
(25)
A computer program causing a computer to execute:
performing control to detect leaving of a user from an information processing apparatus and transmit at least part of context information exchanged with the user until then to another apparatus.
(26)
An information processing method including:
performing control to detect approaching of a user to an information processing apparatus and receive at least part of context information exchanged with the user until then from another apparatus.
(27)
A computer program causing a computer to execute:
performing control to detect approaching of a user to an information processing apparatus and receive at least part of context information exchanged with the user until then from another apparatus.

REFERENCE SIGNS LIST 100, 200 information processing apparatus
110 control unit
120 detecting unit
130 context information managing unit
300 sensor
400a, 400b input/output device

The invention claimed is:
1. An information processing apparatus comprising:
processing circuitry configured to
receive direction information indicating a direction of movement of another apparatus communicating with the information processing apparatus,
perform control to detect leaving of the another apparatus from the information processing apparatus based on the direction information, and
transmit, in response to detecting leaving of the another apparatus, at least part of context information exchanged with the information processing apparatus until then to the another apparatus.
2. The information processing apparatus according to claim 1,
wherein the processing circuitry performs control to directly transmit the context information to the another apparatus.
3. The information processing apparatus according to claim 1,
wherein the processing circuitry performs control to transmit the context information to the another apparatus via a server apparatus.
4. The information processing apparatus according to claim 1,
wherein the processing circuitry detects an apparatus which holds the context information using a user ID and extracts the context information.
5. The information processing apparatus according to claim 4,
wherein the processing circuitry extracts the context information based on the user ID.
6. The information processing apparatus according to claim 4,
wherein the processing circuitry extracts the context information based on another user ID different from the user ID.
7. The information processing apparatus according to claim 1,
wherein the processing circuitry detects the direction of the movement of the user by detecting behavior of the user on a basis of sensing data.
8. The information processing apparatus according to claim 7,
wherein the processing circuitry detects the direction of the movement of the user by detecting the behavior of the user using an image captured with an imaging apparatus and further based on a change in size of the image over time.
9. The information processing apparatus according to claim 1,
wherein the processing circuitry performs control to transmit a portion of the context information generated in a partial time slot based on a connection status between the information processing apparatus and the another apparatus.
10. The information processing apparatus according to claim 1,
wherein the processing circuitry determines a transmission destination of the context information using information in which an apparatus is associated with a location of the apparatus.
11. The information processing apparatus according to claim 1,
wherein the processing circuitry broadcasts the context information to possible apparatuses in a case where a transmission destination of the context information is not uniquely determined, the possible apparatuses being identified based on proximity to the information processing apparatus.
12. The information processing apparatus according to claim 1, wherein the context information is information based on voice input by the user.

13. An information processing apparatus comprising:
processing circuitry configured to
receive direction information indicating a direction of movement of another apparatus communicating with the information processing apparatus
perform control to detect approaching of the another apparatus to the information processing apparatus based on the direction information, and
receive, in response to detecting the approaching of the another apparatus, at least part of context information exchanged with the information processing apparatus until then from the another apparatus.

14. The information processing apparatus according to claim 13,
wherein the processing circuitry performs control to directly receive the context information from the another apparatus with which the user interacts until then.

15. The information processing apparatus according to claim 13,
wherein the processing circuitry performs control to receive the context information from the another apparatus with which the user interacts until then via a server apparatus.

16. The information processing apparatus according to claim 13,
wherein the processing circuitry detects a direction of movement of the user by detecting behavior of the user on a basis of sensing data.

17. The information processing apparatus according to claim 16,
wherein the processing circuitry detects the direction of the movement of the user by detecting the behavior of the user using an image captured with an imaging apparatus and further based on a change in size of the image over time.

18. A method implemented by an information processing apparatus, the method comprising:
receiving direction information indicating a direction of movement of another apparatus communicating with the information processing apparatus;
detecting, via processing circuitry of the information processing apparatus, leaving of the another apparatus from the information processing apparatus based on the direction information; and
transmitting, in response to detecting leaving of the another apparatus, at least part of context information exchanged with the information processing apparatus until then to the another apparatus.

19. A non-transitory computer readable medium having computer readable instructions stored thereon which when executed by an information processing apparatus cause the information processing apparatus to execute a method comprising:
receiving direction information indicating a direction of movement of another apparatus communicating with the information processing apparatus;
detecting, via processing circuitry of the information processing apparatus, leaving of the another apparatus from the information processing apparatus; and
transmitting, in response to detecting leaving of the another apparatus, at least part of context information exchanged with the information processing apparatus until then to the another apparatus.

* * * * *